(12) United States Patent
Kusafuka et al.

(10) Patent No.: US 6,290,627 B1
(45) Date of Patent: Sep. 18, 2001

(54) CONTROL UNIT OF AUTOMATIC TRANSMISSION

(75) Inventors: Muneo Kusafuka; Masamichi Unoki, both of Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 09/525,466

(22) Filed: Mar. 15, 2000

(30) Foreign Application Priority Data

Mar. 24, 1999 (JP) .................................................. 11-080479

(51) Int. Cl.[7] .................................................... B60K 41/20
(52) U.S. Cl. ............................ 477/187; 477/94; 477/139; 477/144; 477/210
(58) Field of Search .................................. 477/120, 139, 477/144, 187, 210, 94, 118

(56) References Cited

U.S. PATENT DOCUMENTS

| 5,287,773 | * | 2/1994 | Nakawaki et al. | 477/92 |
| 5,460,584 | * | 10/1995 | Kusaka et al. | 477/139 X |
| 5,730,683 | * | 3/1998 | Usuki et al. | 477/144 X |
| 5,931,761 | * | 8/1999 | Tsutsui et al. | 477/118 |
| 5,941,793 | * | 8/1999 | Ito et al. | 477/120 |

FOREIGN PATENT DOCUMENTS

| 2211902 | * | 7/1989 | (GB) | 477/94 |
| 5335866 | * | 4/1978 | (JP) | 477/94 |
| 2/127133 | * | 5/1990 | (JP) | 477/187 |

* cited by examiner

Primary Examiner—Charles A Marmor
Assistant Examiner—Ha Ho
(74) Attorney, Agent, or Firm—Aisin AW Co., Ltd.

(57) ABSTRACT

A control unit for an automatic transmission provides improved responsiveness to a speed reduction operation by the driver. The control unit includes a speed reduction requirement judging logic which judges whether or not there is a speed reduction requirement. An up-shift is inhibited and prevented when a judgement is made that there is a speed reduction requirement, based at least in part on release of the accelerator. Accordingly, it is possible to prevent a vehicle from being accidentally accelerated by an up-shift operation and to smoothly perform a down-shift to effect an engine brake.

4 Claims, 9 Drawing Sheets

FIG. 7

| REDUCTION SPEED<br>CURRENT GEAR STAGE | -2M/SEC | -7M/SEC |
|---|---|---|
| 2ND | 20KM/H | 30KM/H |
| 3RD | 30KM/H | 40KM/H |
| 4TH | 40KM/H | 50KM/H |

TBL

MV    MV

CONTROL UNIT OF AUTOMATIC TRANSMISSION

BACKGROUND OF THE INVENTION

1. Field of the Invention

The present invention relates to a control unit of an automatic transmission which provides speed reduction control with good responsiveness to a speed reduction demand by a driver of the vehicle.

2. Description of Related Art

Speed reduction responsive to a speed reduction operation by a driver of a vehicle, such as a sudden release of the accelerator, braking or the like, is conventionally provided by a control system which monitors reduction in vehicle speed during brake operation, performs a down-shift operation when it is judged that the reduction in speed has reached a predetermined large value, and effects speed reduction by engine braking. However, with this conventional control system, there is a time delay between depression of the brake and the reduction in speed reaching the predetermined large value, and a down-shift operation cannot be performed during that time delay. Accordingly, an undesirably long time delay occurs before engine braking is actually provided by a down-shift operation after the driver demands the speed reduction, i.e., the system does not provide good responsiveness.

Further, since the speed change operation is generally performed based on a speed change map, an up-shift operation is performed responsive to an accelerator OFF operation. There are times when a down-shift operation may be performed due to the reduction in speed becoming equal to or greater than a predetermined value. In this case, the up-shift operation and the down-shift operation are both performed within a short time interval, thereby causing discomfort to the driver.

SUMMARY OF THE INVENTION

In view of the foregoing problem, an object of the present invention is to provide a control unit for an automatic transmission which can perform proper down-shift control with superior responsiveness to a speed reduction operation by a driver.

Accordingly, the present invention provides a control unit for an automatic transmission connected to a vehicle engine which includes speed reduction requirement judging means for judging whether or not there is a speed reduction demand based on an accelerator releasing operation by a driver, brake operation detecting means for judging whether or not a first time interval between full release of the accelerator and operation of the brake is within a predetermined time range, up-shift operation inhibiting means for inhibiting an up-shift of the transmission when the speed reduction requirement judging means judges that there is a speed reduction demand, and down-shift executing means for executing a down-shift of the transmission when the brake operation detecting means judges that the brake was operated (engaged) within the predetermined time range.

Further, the up-shift inhibiting means inhibits (prevents) an up-shift until a second time interval has passed with the accelerator in an idle state, when the brake is not depressed within the predetermined time range.

The up-shift inhibiting means prevents an up-shift until the accelerator is depressed, when the brake is not depressed within the predetermined time range.

Further, the up-shift inhibiting means prevents an up-shift until the speed change is judged completed based on the normal speed change map, when the brake is depressed after the predetermined time has passed with the accelerator in the idle state.

In accordance with the present invention, when the speed reduction requirement judging means judges, based on release of the accelerator, that there is a speed reduction demand by the driver, the up-shift inhibiting means inhibits the up-shift operation of the transmission so that it is possible to prevent a speed reduction force on the vehicle from being reduced due to the up-shift operation. Further, when the brake is operated within the predetermined time after the accelerator is released, the down-shift operation is executed so that it is possible to effectively provide the engine brake by the down-shift operation. Also, it is possible to prevent an up-shift and a down-shift from being continuously performed within a short time so as to cause discomfort to the driver.

Further, by setting the second predetermined time interval, an up-shift is not inhibited indefinitely, and a normal speed change may be smoothly performed after the second predetermined time interval has lapsed.

Also, when the driver quits the speed reduction operation and again depresses the accelerator, an up-shift is inhibited until the accelerator is depressed so that it is possible to rapidly move to the acceleration operation.

Further, when the brake is depressed after the predetermined time has passed in the idle state, an up-shift is inhibited until there is a speed change judgment based on the normal speed change map, so that it is possible to prevent the discomfort to the driver that would otherwise be caused by a plurality of continuously performed speed change operations.

The teachings of Japanese Application H11-80479, filed Mar. 24, 1999, inclusive of specification, claims, drawings and summary, are incorporated herein by reference in their entirety.

BRIEF DESCRIPTION OF THE DRAWINGS

FIG. 7 is one example of a table of upper limit speeds;

DESCRIPTION OF THE PREFERRED EMBODIMENT

Figure 1:
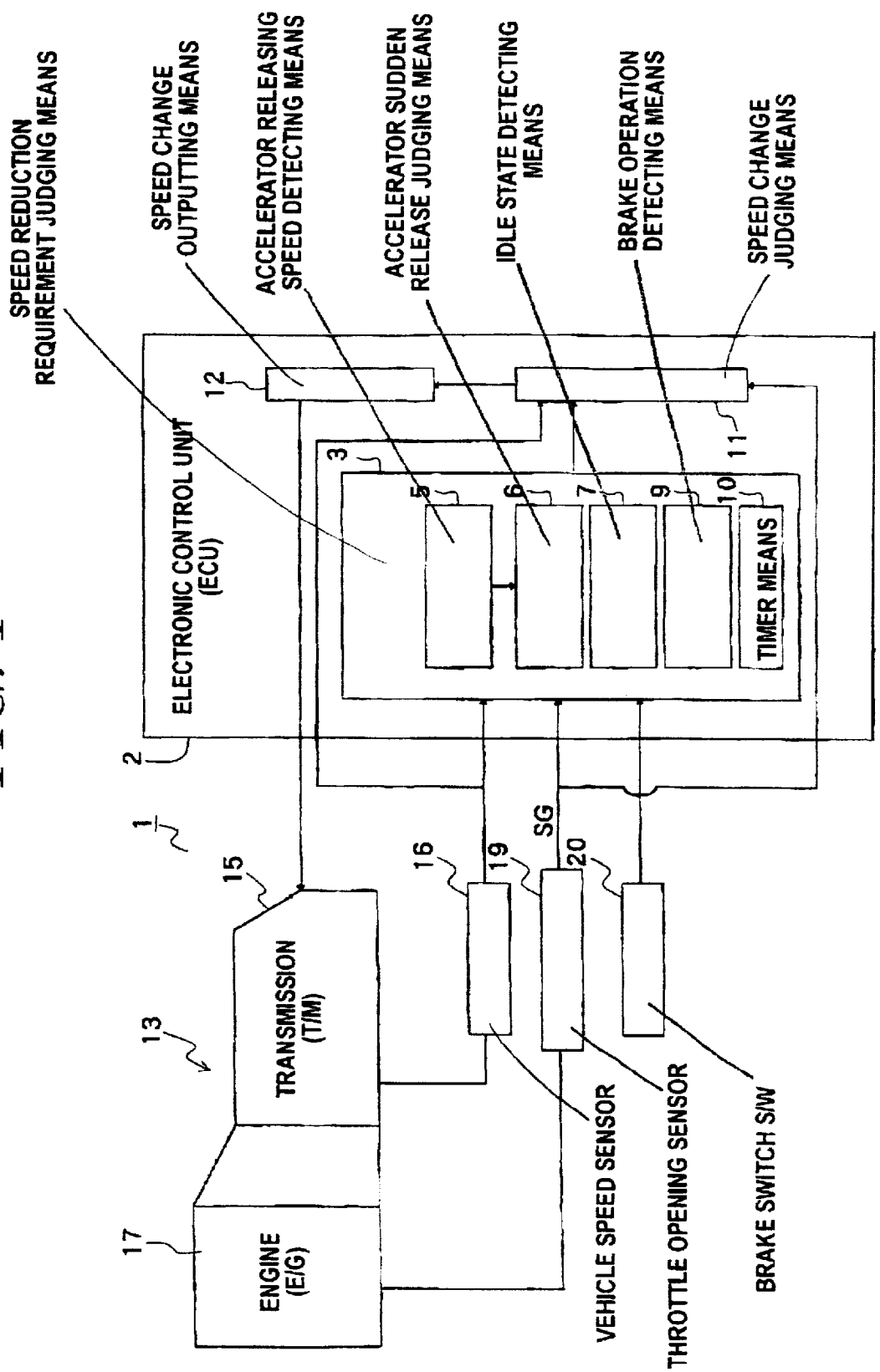
FIG. 1 is a block diagram of one embodiment of a control unit for an automatic transmission in accordance with the present invention.

As shown in FIG. 1, a control unit 1 for an automatic transmission includes an electronic control unit 2 and the electronic control unit 2 which is provided with a speed reduction requirement judging means 3. The speed reduction requirement judging means 3, in turn, includes an accelerator releasing speed detecting means 5, accelerator sudden release judging means 6, idle state detecting means 7, brake operation detecting means 9, and timer 10. The electronic control unit 2 further includes speed change judging means 11 connected to the speed reduction requirement judging means 3, and the speed change judging means 11, in turn, includes speed change output means 12. The speed change output means 12 is connected to a transmission 15 of an automatic transmission 13 and a vehicle speed sensor 16 is also connected to the transmission 15. An engine 17, which is the power source for the vehicle, is connected to the transmission 15, and a throttle opening sensor 19 is provided on the engine 17. The vehicle speed sensor 16, the throttle opening sensor 19, and a brake switch 20 all send signals to the speed reduction requirement judging means 3.

Rotation of the engine 17 is input to the transmission 15 of the automatic transmission 13 where it is changed to a desired speed and output to drive wheels, for travel of the vehicle at a speed desired by the driver. The accelerator sudden release judging means 6 then judges whether or not the driver released the accelerator due to a need for a sudden speed reduction, thereby causing the current change of the throttle opening. Stated differently, the accelerator sudden release judging means 6 determines whether or not a speed reduction demand has been made by the driver as indicated by the calculated accelerator release speed. When the accelerator release speed is equal to or greater than a predetermined value, it is judged that the driver released the accelerator due to a need for sudden speed reduction, thereby causing the current change of the throttle opening, and the subroutine proceeds to step S5.

Here, when the accelerator release speed is determined to be equal to or less than a predetermined value in step S4, it is judged that the driver did not release the accelerator due to a need for sudden speed reduction, so that the speed change control is not performed with the speed change control program TPR.

In step S5 of subroutine SUB1, the idle state detecting means 7 drives the timer means 10 so as to set an idle judging timer. The subroutine then proceeds to step S6 for control holding the gear stage of the transmission 15 at the gear stage prior to temporarily releasing the accelerator via the speed change judging means 11 and the speed change outputting means 12. Moreover, in step S7, the gear stage hold flag 1 changes from OFF to ON.

Figure 2:
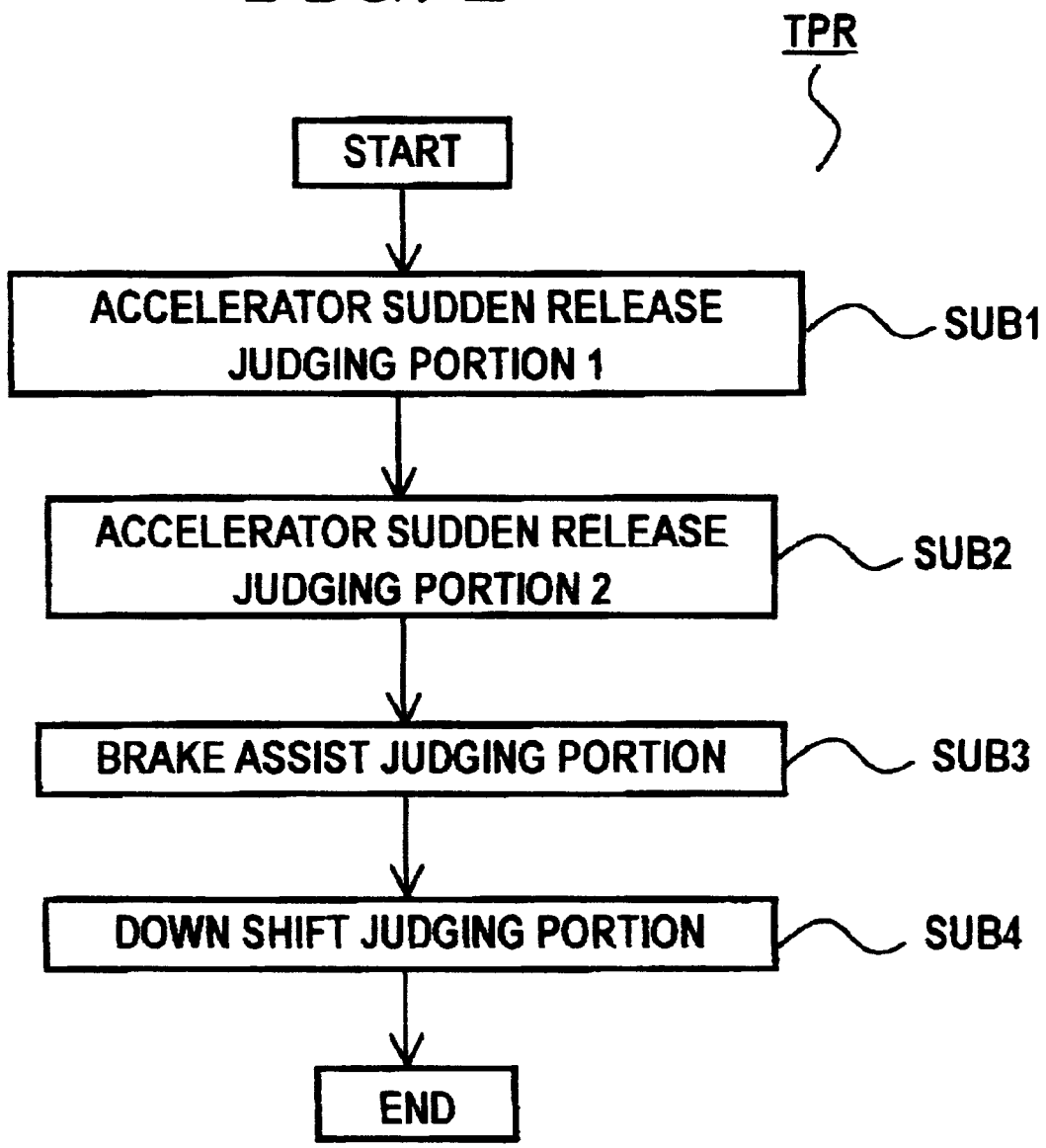
FIG. 2 is a flow chart of one embodiment of a speed change control routine in accordance with the present invention.

When the driver wants to reduce speed for some reason while the vehicle is running with the transmission 15 in third speed or fourth speed, as shown in FIG. 8(a), the driver suddenly releases his/her foot from the depressed accelerator pedal. With this sudden releasing of the accelerator, a signal SG from the throttle opening sensor 19, indicating the throttle opening, changes and the changed signal SG is input to the speed reduction requirement judging means 3 of the electronic control unit 2. The speed reduction requirement judging means 3 reads out a speed change control program TPR, as shown in FIG. 2, from a memory (not shown) and executes a subroutine SUB1 for accelerator sudden release judging in accordance with the change in the signal SG.

The subroutine SUB1 for the accelerator sudden release judging 1 judges (step S1 shown in FIG. 3) whether or not the gear stage hold flag 2 is OFF. Normally, in an initial state, since the gear stage hold flag 2 is in an OFF state, as shown in FIG. 8(a), the subroutine SUB1 proceeds to step S2 where the judgement is made whether or not the gear stage hold flag 1 is OFF. In the initial state, since the gear stage hold flag 1 is OFF, the subroutine process proceeds to step S3.

In step S3 of subroutine SUB1, the speed reduction requirement judging means 3 makes the accelerator releasing speed detecting means 5 calculate the accelerator releasing speed and outputs the obtained value to the accelerator sudden release judging means 6.

Figure 4:
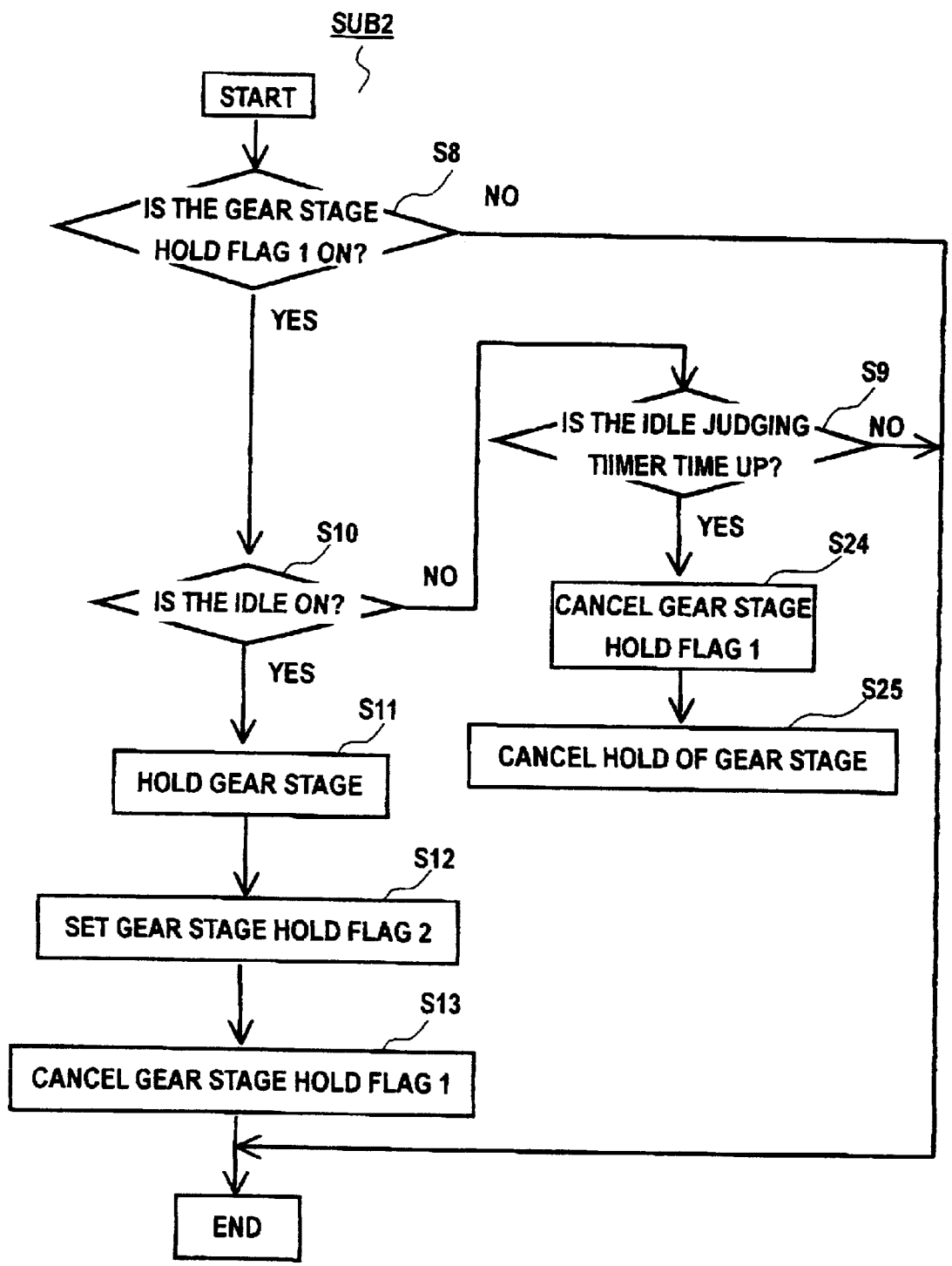
FIG. 4 is a flow chart of an accelerator sudden release judging subroutine shown as SUB2 in FIG. 2.

Next, the speed change control program TPR goes to subroutine SUB2 for finish of accelerator sudden release judging (portion 2), as shown in FIG. 4. In step S8 of the subroutine SUB2, the speed reduction requirement judging means 3 judges whether or not the gear stage hold flag 1 is ON, and since it became ON in step S7 of the subroutine SUB1, the subroutine SUB2 proceeds to step S10.

Figure 8:
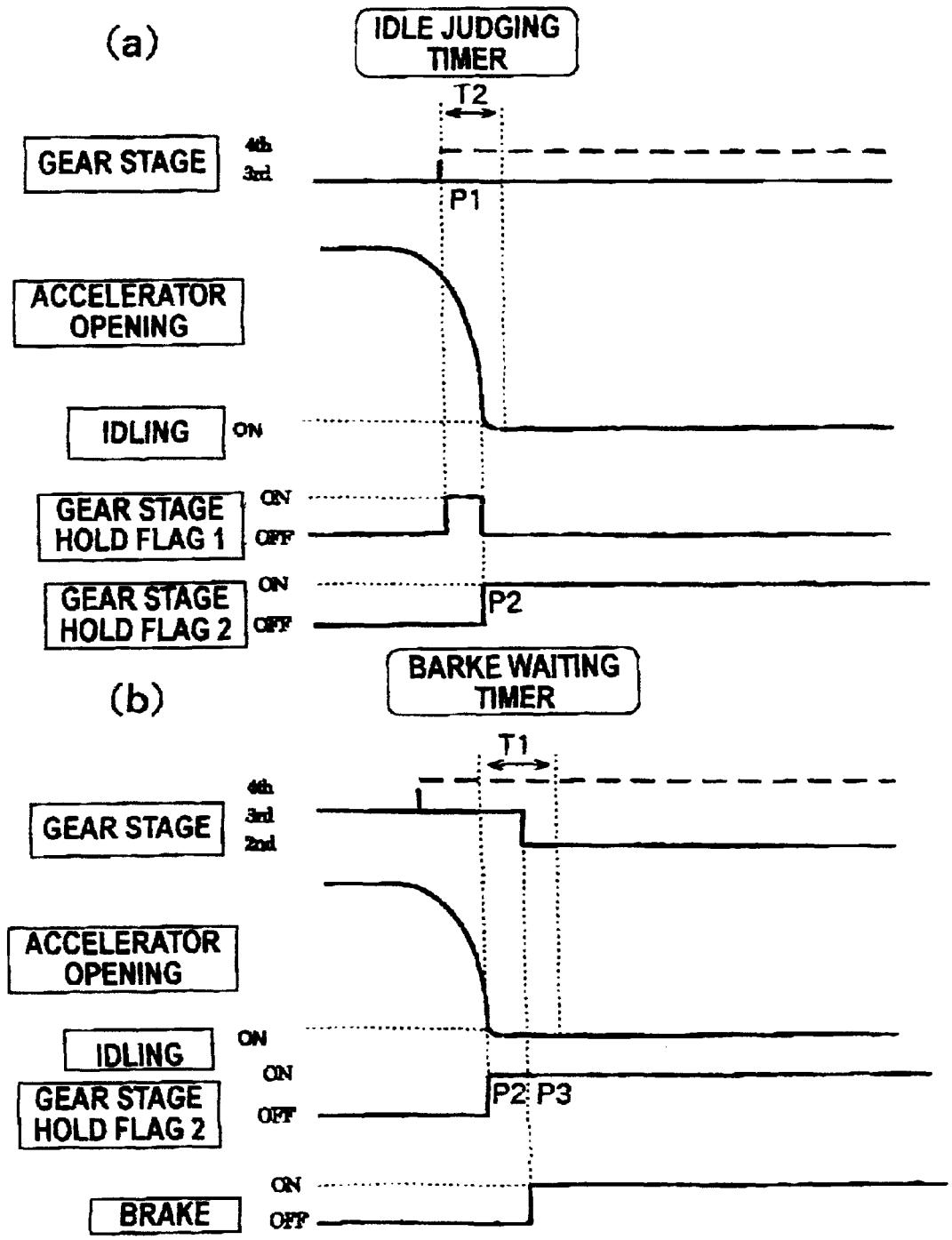
FIG. 8 is one example of a timing chart plotting gear stages, accelerator opening, various flags, and timing for operation of a brake.
Figure 9:
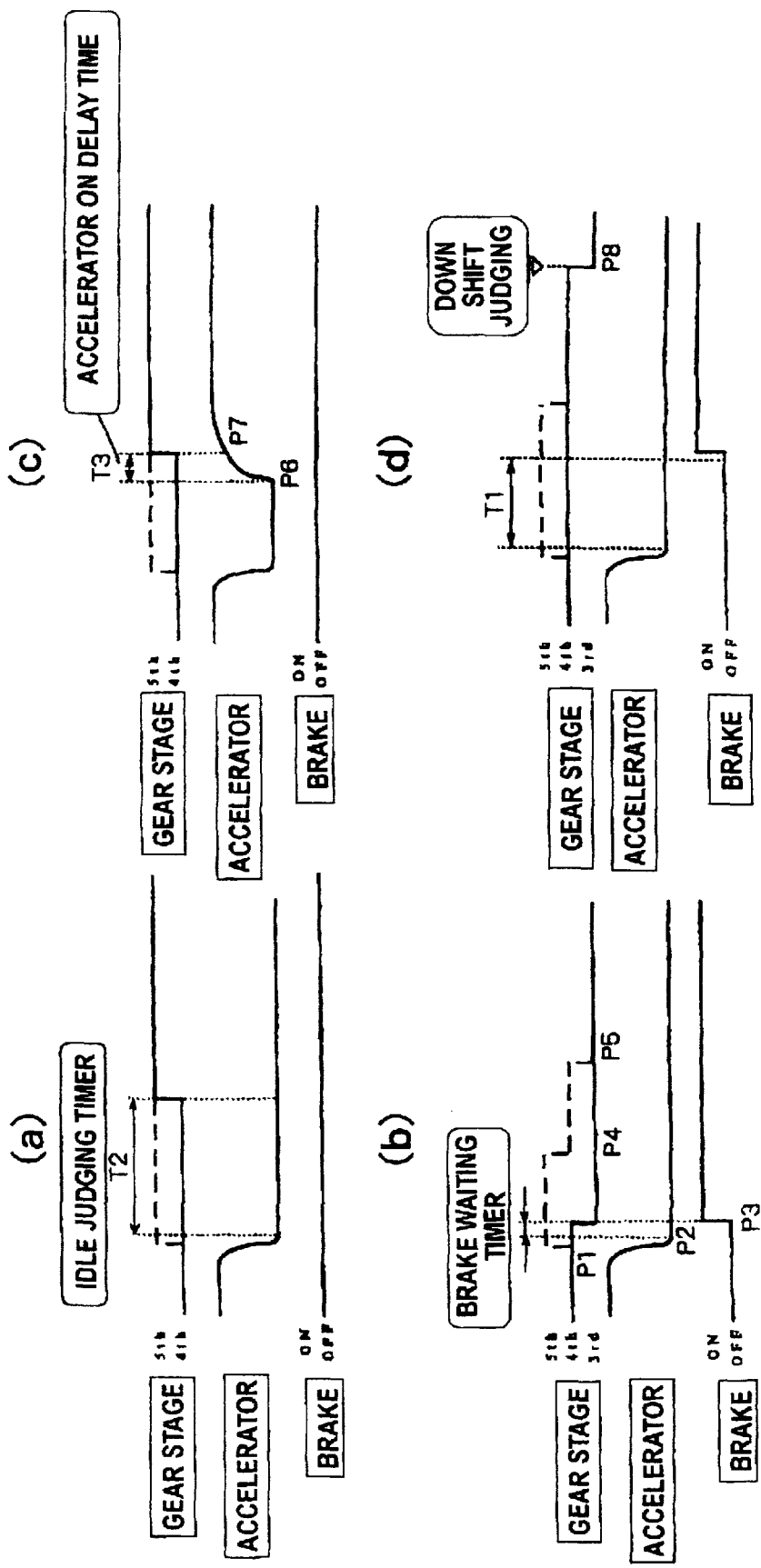
FIG. 9 is another timing chart of gear stages, accelerator opening, and timing of operation of a brake.

In step S10, the speed reduction requirement judging means 3 commands the idle state detecting means 7 to judge whether or not the accelerator is in an idle state, based on the output of the throttle opening sensor 19. When the accelerator is in an idle state, as shown in FIG. 8(a), the speed reduction requirement judging means 3 judges that the idle is ON and proceeds to step S11 so that the speed reduction requirement judging means 3 commands holding of the transmission 15 in the gear stage prior to releasing the accelerator, via the speed change judging means 11 and the speed change outputting means 12 (see FIG. 1). Accordingly, the transmission 15 is held at the gear stage prior to releasing the accelerator from a time P1 at which the driver suddenly releases the accelerator, as shown in FIG. 8(a). As shown by a broken line in the drawing, in a conventional system the gear stage of the transmission 15 would be up-shifted by the releasing of the accelerator, contrary to the intention of the driver which is speed reduction. Thus, the broken lines of the gear stage portion of FIG. 8 and FIG. 9, to be described later, show for purposes of comparison a conventional speed change operation, without execution of the speed change control program TPR.

The subroutine SUB2 proceeds to step S12 when the gear stage is held in step S11, as shown in FIG. 8(a), and the gear stage hold flag 2 changes from the previous OFF to ON at a time P2. Furthermore, the gear stage hold flag 1 is changed from ON to OFF in step S13.

Next, the speed reduction requirement judging means 3 enters the brake assist judging of subroutine SUB3 of the speed change control program TPR. In the subroutine SUB3, in step S14 shown in FIG. 5, the speed reduction requirement judging means 3 judges whether or not the gear stage hold flag 2 has changed from OFF to ON. Here, since the gear stage hold flag 2 changed from OFF to ON in step S12 of the subroutine SUB2, the subroutine SUB3 proceeds to step S15 and a brake waiting timer is set by the timer means 10.

The speed reduction requirement judging means 3 judges in step S16 whether or not the brake waiting elapsed time checked by the timer is within a predetermined range. When the brake waiting elapsed time is within the predetermined range, the speed reduction requirement judging means 3 makes the idle state detecting means 7 judge in step S17 whether or not idling is currently ON, that is, whether or not the driver has depressed the accelerator again to thereby cancel the idling state. When idling is currently in the ON state, it is judged that the speed reduction demand by the driver is continuing and the subroutine proceeds to step S18 in which the brake operation detecting means 9 detects the operative state of the brake by signal from the brake switch 20. In step S18, as shown in FIG. 8(b), when it is judged that the brake is being operated by the driver at a time P3, which is within the predetermined time range T1 of the brake waiting timer, the process proceeds to step S19 and the brake assist flag which was previously OFF is changed to ON.

Figure 6:
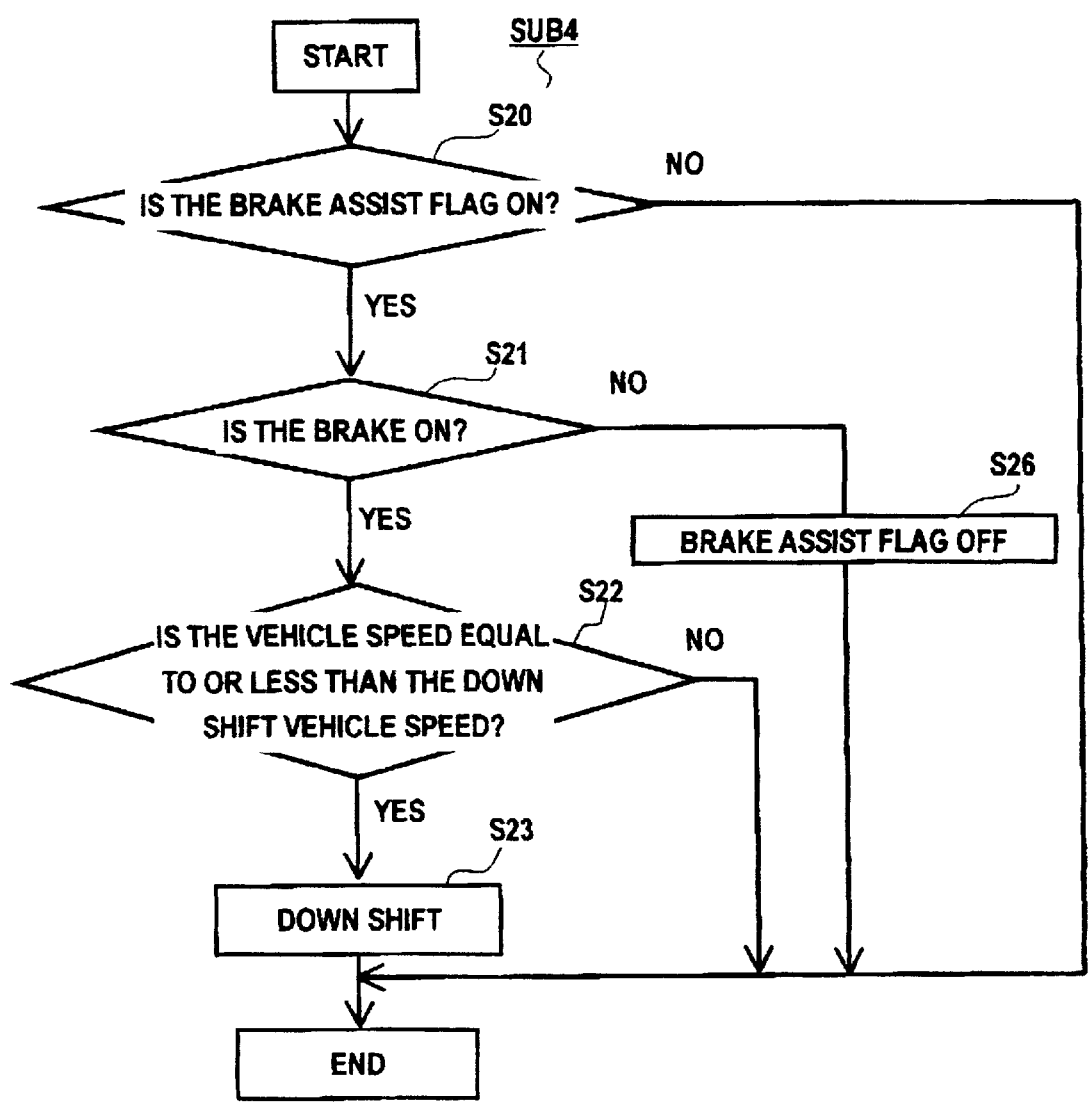
FIG. 6 is a flow chart of one example of a down-shift subroutine.

Next, the speed reduction requirement judging means 3 executes the down-shift judging subroutine SUB4 of the speed change control program TPR shown in FIG. 2. The down-shift judging subroutine SUB4 is shown in FIG. 6. As illustrated in FIG. 6, in step S20 the subroutine SUB4 judges whether or not the brake assist flag is ON. In this case, since the brake assist flag was placed in the ON state in step S19 of the subroutine SUB3, the process proceeds to step S21 and the brake operation detecting means 9 reconfirms whether or not the brake is in the ON state, that is, whether or not the driver is depressing the brake. When it is judged by the brake operation detecting means that the brake is in the OFF state, that is, when the driver is not depressing the brake, it is judged that there is no longer a speed reduction demand by the driver, and the process proceeds to step S26, in which the ON state of the brake assist flag is changed to the OFF state. The down-shift operation is then stopped and execution of the speed change control program TPR is complete.

Further, when it is judged by the brake operation detecting means in step S21 that the brake is in the ON state, that is, the driver is continuing to depress the brake, it is judged that the speed reduction demand by the driver is continuing, and the process proceeds to step S22 in which the speed change judging means 11 judges whether or not the current vehicle speed is equal to or less than a vehicle speed suitable for a down-shift operation. That is, the speed change judging means 11 determines an allowable upper limit speed MV at which the down-shift operation can be performed by reference to the upper limit speed table TBL shown in FIG. 7, which is prestored in a suitable memory, applying the reduction in speed of the vehicle and the currently selected gear stage as parameters. The reduction in speed of the vehicle is calculated from the current gear stage of the transmission 15 and the vehicle speed input from the vehicle speed sensor 16. The down-shift operation is performed only when the current vehicle speed is less than the allowable upper limit speed MV obtained from the upper limit speed table TBL, thereby preventing the vehicle speed from being suddenly reduced.

Since the speed change judging means 11 determines the allowable upper limit speed MV at which the down-shift operation can be performed, by applying the reduction in speed of the vehicle and the currently selected gear stage as parameters to the prestored upper limit speed table TBL, as shown in FIG. 7, the allowable upper limit speed MV can be immediately determined from the table if the current gear stage and the reduction in speed of the vehicle are defined.

When the speed change judging means 11 judges in step S22 that the current vehicle speed is less than the allowable upper limit speed MV determined from the upper limit speed table TBL, the subroutine SUB4 proceeds to step S23, and the electronic control unit 2 instructs the speed change outputting means 12 to execute a down-shift operation. The speed change outputting means 12 makes the transmission 15 perform a down-shift operation, and an engine brake is established corresponding to the speed change reduction required by the driver. In this case, the down-shift operation is performed at substantially the same time the driver depresses the brake, and the down-shift operation is executed so as to correspond in time to the speed reduction demand (requirement) by the driver, as shown in FIG. 9(b).

In the conventional system which does not use the speed change control program TPR, as represented by a broken line in FIG. 9(b), a temporary up-shift is performed at time P2 when the accelerator is suddenly released and the driver depresses the brake and the vehicle starts reducing speed. The gear stage having been shifted up is then shifted down to the original gear stage at a time P4 when the deceleration has exceeded a fixed value and the down-shift operation is again performed at a time P5 when the deceleration has exceeded the fixed value. The down-shift is to the gear stage desired by the driver. Accordingly, not only does the time delay before the down-shift operation to the gear stage desired by the driver become significantly longer than that with the present invention, but also one unnecessary up-shift operation and one unnecessary down-shift operation are performed.

When the idle is OFF in step S10 of the subroutine SUB2 in FIG. 4, that is, when the accelerator is not yet in an idle state, the subroutine proceeds to step S9 where it is judged whether or not the time of the idle judging timer has expired. When the time of the idle judging timer has not expired, that is, when a second predetermined time interval T2, which is set as the time required until the idle becomes ON after suddenly releasing the accelerator, has not yet passed, the routine returns from the subroutine SUB2 to the speed change control program TPR in FIG. 2, again proceeds through subroutine SUB1 to step S10 in subroutine SUB2 and waits in step S10 until the idle becomes ON.

Figure 3:
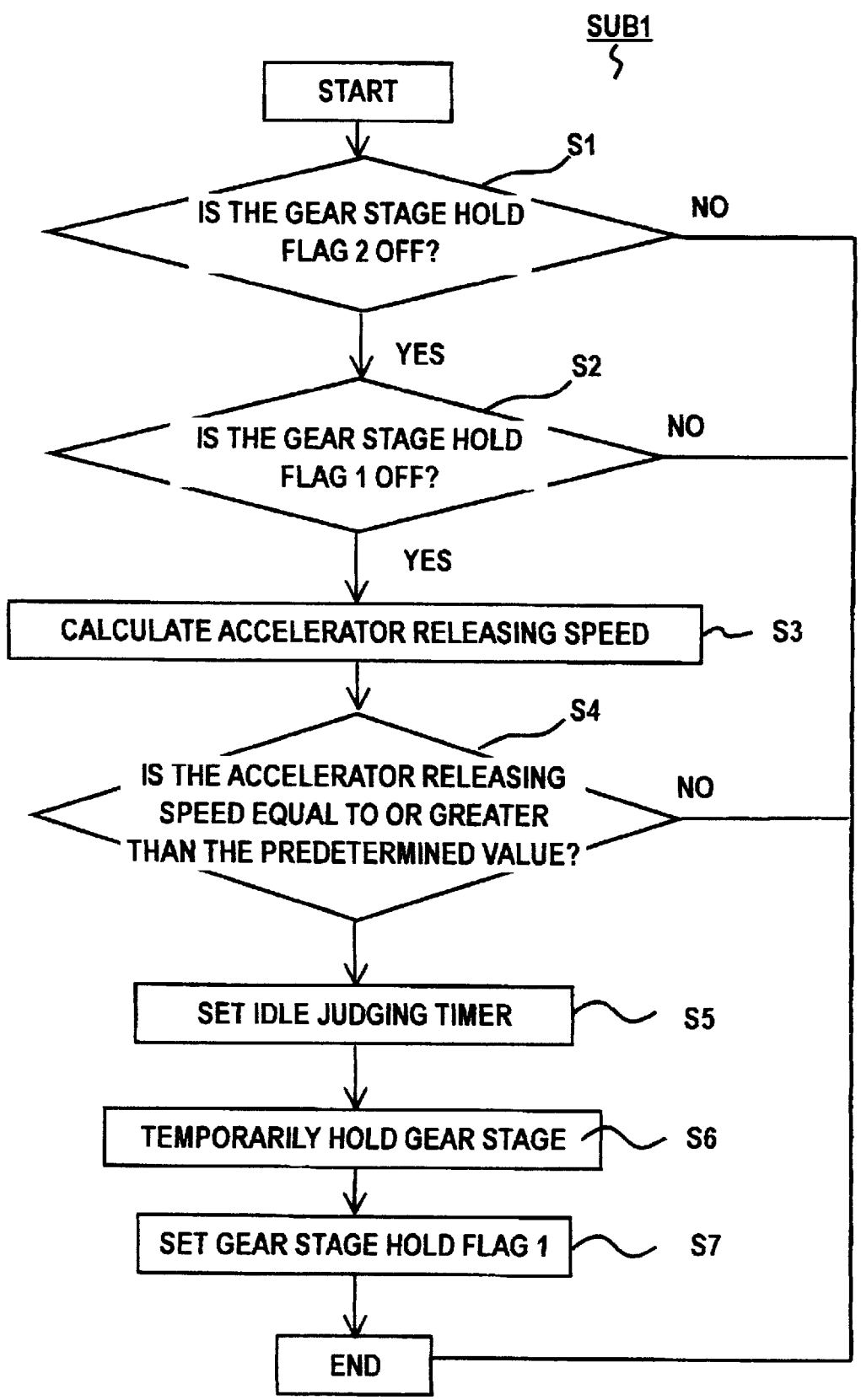
FIG. 3 is a flow chart of an accelerator sudden release judging subroutine shown as SUB1 in FIG. 2.

When the time of the idle judging timer has expired in step S9, for example, when the accelerator is suddenly released by the driver and the idle does not become ON within the predetermined time T2, as shown in FIG. 9(a), that is, when the speed reduction demand has been abandoned without depressing the brake despite the fact that the driver has suddenly released the accelerator, the process proceeds to step S24 so that the gear stage hold flag 1, which has been set in step S7 shown in FIG. 3, is cancelled and the gear stage which was temporarily held in step S6 of the subroutine SUB1 is cancelled in step S25. Then, the electronic control unit 2 stops the execution of the speed change control program TPR, and performs an up-shift operation based on the normal speed change map as shown in FIG. 9(a).

Also, in step S10 of the subroutine SUB2, when the idle becomes OFF and the driver again depresses the accelerator, the electronic control unit 2 stops the execution of the speed change control program TPR, and as shown in FIG. 9(c), performs an up-shift operation based on the normal speed change map at the time P7, which is after a delay time T3 for a predetermined acceleration has passed from the time P6 at which the accelerator is depressed.

Figure 5:
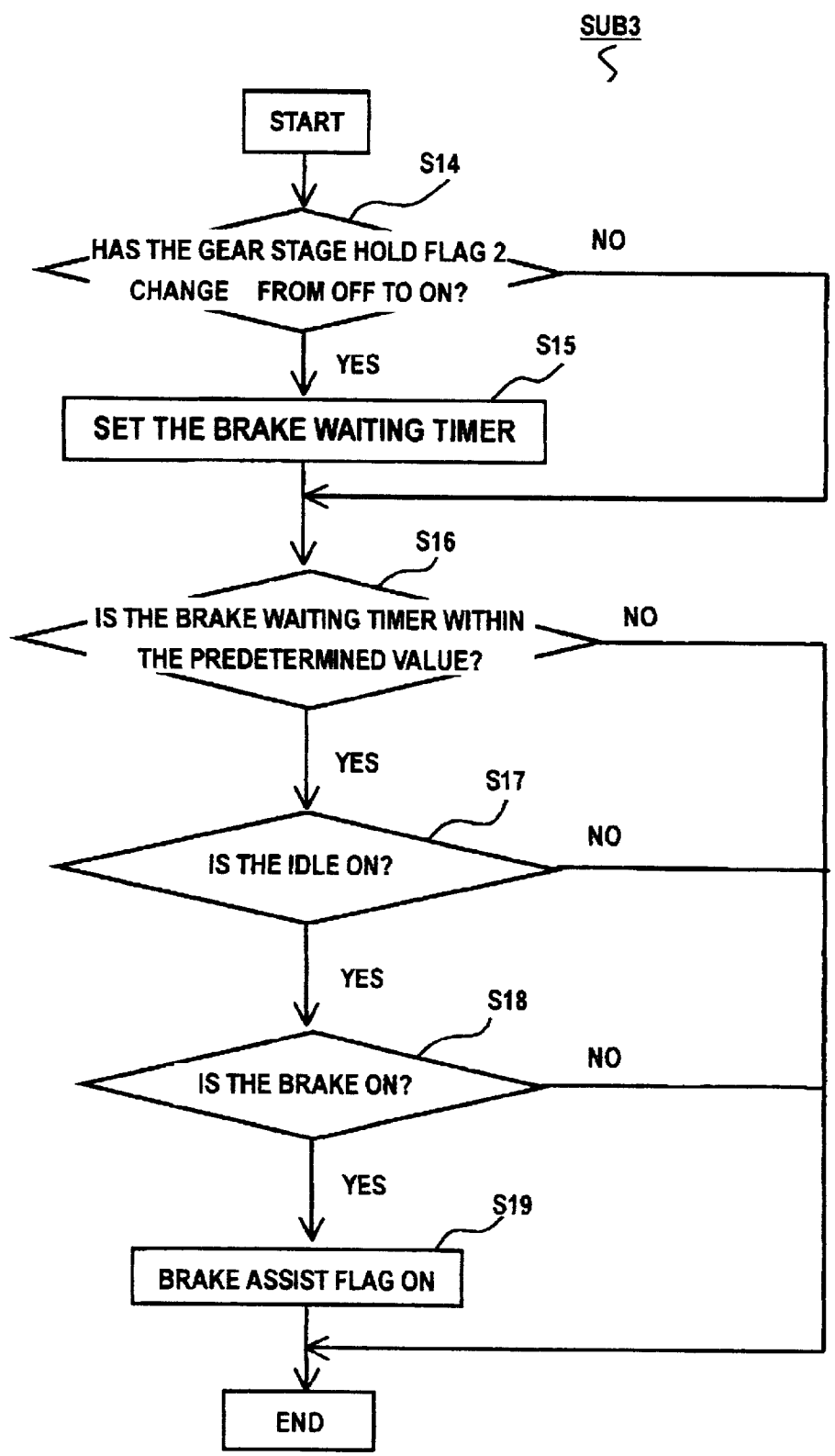
FIG. 5 is a flow chart of a brake assist judging subroutine shown as SUB3 in FIG. 2.

Further, when the driver depresses the brake, as shown in FIG. 9(d) after the time of the brake waiting timer has lapsed, i.e., after the predetermined time T1 has passed in step S16 of the subroutine SUB3 in FIG. 5, the electronic control unit 2 stops the execution of the speed change control program TPR and begins to perform a speed change operation based on the normal speed change map. A down-shift operation is then performed following a normal speed change judgment at the time P8 when the vehicle speed has been reduced. At this time, the electronic control unit 2 prevents an up-shift operation until a down-shift judgment at the time P8 is made, even when the brake is depressed and the execution of the speed change control program TPR is stopped, thereby preventing up-shift and down-shift operations from being continuously performed within a short time, thereby causing discomfort to the driver.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control unit for control of a speed change operation by an automatic transmission connected to an engine mounted on a vehicle, said control unit comprising:

speed reduction requirement judging means for judging whether or not there is a speed reduction requirement based on an accelerator releasing operation by a driver;

brake operation detecting means for judging whether or not a time elapsed between said accelerator releasing operation and depression of a brake is within a first predetermined time interval;

up-shift inhibiting means for inhibiting an up-shift of said transmission when said speed reduction requirement judging means judges that there is a speed reduction requirement; and down-shift executing means for executing a down-shift of said transmission when said brake operation detecting means judges that said brake was operated within said first predetermined time interval.

2. The control unit according to claim 1, wherein said up-shift operation inhibiting means inhibits the up-shift operation until a second predetermined time interval has passed with said accelerator in an idle state, when the brake is not depressed within said first predetermined time interval.

3. The control unit according to claim 1, wherein said up-shift operation inhibiting means inhibits the up-shift operation until said accelerator is depressed, when the brake is not depressed within said first predetermined time interval.

4. The control unit according to claim 1, wherein said up-shift operation inhibiting means inhibits the up-shift until a speed change is judged based on a normal speed change map, when the brake is depressed after said first predetermined time interval has passed with said accelerator in an idle state.

* * * * *

UNITED STATES PATENT AND TRADEMARK OFFICE
CERTIFICATE OF CORRECTION

PATENT NO. : 6,290,627 B1
DATED : September 18, 2001
INVENTOR(S) : Kusafuka et al.

It is certified that error appears in the above-identified patent and that said Letters Patent is hereby corrected as shown below:

<u>Column 3,</u>
Lines 21-48, after "driver.", delete:
"The accelerator sudden release judging means 6 judges whether or not the driver released the accelerator due to a need for a sudden speed reduction, thereby causing the current change of the throttle opening. Stated differently, the accelerator sudden release judging means 6 determines whether or not a speed reduction demand has been made by the driver as indicated by the calculated accelerator release speed. When the accelerator release speed is equal to or greater than a predetermined value, it is judged that the driver released the accelerator due to a need for sudden speed reduction, thereby causing the current change of the throttle opening, and the subroutine proceeds to step S5.
　　　Here, when the accelerator release speed is determined to be equal to or less than a predetermined value in step S4, it is judged that the driver did not release the accelerator due to a need for sudden speed reduction, so that the speed change control is not performed with the speed change control program TPR.
　　　In step S5 of subroutine SUB1, the idle state detecting means 7 drives the timer means 10 so as to set an idle judging timer. The subroutine then proceeds to step S6 for control holding the gear stage of the transmission 15 at the gear stage prior to temporarily releasing the accelerator via the speed change judging means 11 and the speed change outputting means 12. Moreover, in step S7, the gear stage hold flag 1 changes from OFF to ON."

UNITED STATES PATENT AND TRADEMARK OFFICE
CERTIFICATE OF CORRECTION

PATENT NO.    : 6,290,627 B1
DATED         : September 18, 2001
INVENTOR(S)   : Kusafuka et al.

It is certified that error appears in the above-identified patent and that said Letters Patent is hereby corrected as shown below:

Column 4,
Line 7, after "means 6.", without beginning a new paragraph, insert:
  -- The accelerator sudden release judging means 6 judges whether or not the driver released the accelerator due to a need for a sudden speed reduction, thereby causing the current change of the throttle opening. Stated differently, the accelerator sudden release judging means 6 determines whether or not a speed reduction demand has been made by the driver as indicated by the calculated accelerator release speed. When the accelerator release speed is equal to or greater than a predetermined value, it is judged that the driver released the accelerator due to a need for sudden speed reduction, thereby causing the current change of the throttle opening, and the subroutine proceeds to step S5.
  Here, when the accelerator release speed is determined to be equal to or less than a predetermined value in step S4, it is judged that the driver did not release the accelerator due to a need for sudden speed reduction, so that the speed change control is not performed with the speed change control program TPR.
  In step S5 of subroutine SUB1, the idle state detecting means 7 drives the timer means 10 so as to set an idle judging timer. The subroutine then proceeds to step S6 for control holding the gear stage of the transmission 15 at the gear stage prior to temporarily releasing the accelerator via the speed change judging means 11 and the speed change outputting means 12. Moreover, in step S7, the gear stage hold flag 1 changes from OFF to ON. --

Signed and Sealed this

Twenty-fourth Day of September, 2002

*Attest:*

JAMES E. ROGAN
*Attesting Officer*   *Director of the United States Patent and Trademark Office*